United States Patent [19]

Stakhov et al.

[11] 4,276,608
[45] Jun. 30, 1981

[54] FIBONACCI P-CODE PARALLEL ADDER

[76] Inventors: Alexei P. Stakhov, prospekt Kosmonavtov 54, kv. 130; Nikolai A. Solyanichenko, ulitsa Vasilia Porika 30, kv. 108; Vladimir A. Luzheisky, ulitsa Vasilia Porika, 30, kv. 108; Alexandr V. Ovodenko, ulitsa 600-letia, 44/75, kv. 16; Andrei A. Kozak, prospekt Leninskogo Komsomola 53, kv. 40, all of Vinnitsa, U.S.S.R.

[21] Appl. No.: 38,930

[22] Filed: May 14, 1979

[30] Foreign Application Priority Data

May 15, 1978 [SU] U.S.S.R. .................... 2617011

[51] Int. Cl.³ .................................. G06F 7/49
[52] U.S. Cl. ................................... 364/768
[58] Field of Search ........................ 364/768

[56] References Cited

U.S. PATENT DOCUMENTS

4,159,529  6/1979  Stakhov ................... 364/768

FOREIGN PATENT DOCUMENTS

577528  11/1977  U.S.S.R. ................... 364/768

*Primary Examiner*—David H. Malzahn
*Attorney, Agent, or Firm*—Lackenbach, Lilling & Siegel

[57] ABSTRACT

A Fibonacci p-code parallel adder comprises an augend register and an addend register having outputs coupled to the inputs of an end-of-addition detector and a monitoring unit and to the data inputs of a logic unit which comprises n rewrite AND gates. The AND gates have their inputs coupled to the complement and true outputs respectively of the augend and addend registers so as to provide for analyzing the condition of the flip-flips of the registers, and have their outputs coupled to the set inputs of the bit positions of the augend register and, via a delay unit, to the reset inputs of the bit position of the addend register, which provides for transfer of a 1 from the ith bit position of the addend register to the ith bit position of the augend register containing a 0. A Fibonnaci p-code minimizing unit has its inputs coupled to the outputs of the augend and addend registers, and has its outputs coupled to the normalize signal input of the augend register. This allows for the reduction of the codeword contained in the augend register to the minimal form with the codeword contained in the addend register being taken into consideration.

1 Claim, 2 Drawing Figures

FIBONACCI P-CODE PARALLEL ADDER

FIELD OF THE INVENTION

The invention relates to computer engineering and, more particularly, to Fibonacci code parallel adders. It can be used in computers where multidigit numbers in the form of a Fibonacci code are to be summed.

DESCRIPTION OF THE PRIOR ART

Known in the art is a combination-type adder in which a summation of multidigit numbers in the form of a Fibonacci code is performed and which comprises one-digit binary adders, a signal distribution unit and AND and OR gates (cf. U.S.S.R. Inventor's Certificate No. 570,896, Int.Cl. G06 f, 7/50, 1977).

There is an accumulating adder comprising complement flip-flops, modulo 2 adders, AND and OR gates, and delays, which is used to sum up multidigit numbers belonging to Fibonacci number systems (cf. U.S.S.R. Inventor's Certificate No. 577,528, Int.cl. G06 f, 7/50, 1977).

There is also a Fibonacci code parallel adder (cf. USSR Inventor's Certificate No. 559,237, Int.Cl. G06 f, 7/50, 1977) comprising augend and addened registers which are designed to store the source codewords of the augend and addend and the codewords of the intermediate sum and carry resulting from the addition. The outputs of the registers are coupled to the inputs of a logic unit which performs addition and which is a multidigit parallel half-adder. The logic unit comprises a plurality of AND and OR gates which are interconnected in accordance with the used addition algorithm. During each cycle of the addition process relating to a given pair of numbers, the corresponding codewords of the intermediate sum and carry are generated. The outputs of the logic units are coupled to the data inputs of the registers and the codewords of the intermediate sum and carry are applied to these inputs for writing. The addition process includes a number of cycles which are repeated until the carry codeword contains 0's. The adder also comprises a Fibonacci code minimizing unit which is coupled to the augend register, thereby providing for a reduction of a codeword contained therein to the minimal form. An end-of-addition detector used to indicate the end of addition produces a respective signal when the carry codeword contains 0's. The adder also comprises a monitoring unit coupled to the register outputs and designed to check whether a Fibonacci code is reduced to the minimal form properly. The output of the monitoring unit produces a corresponding signal when the codewords contained in the registers differ from the minimal form.

BACKGROUND OF THE INVENTION

The known Fibonacci code adders have a low operational speed since they function in a synchronous mode when the control input of the adder receives short control pulses. During each cycle of the addition process, the intermediate sum and carry codewords are formed which are stored in the registers and the intermediate sum codeword is then reduced to the minimal form. The next cycle deals with the summation of the stored codewords of the intermediate sum and carry, and new codewords are then formed, etc. The process is repeated until the carry contains 0's and the sum obtained corresponds to the minimal form. The maximum number of cycles for the described adder is equal to n/2 where n is the length of the augend and addend in the form of a Fibonacci code.

The length of a single addition cycle must be sufficient for the intermediate or final result of addition to be reduced to the minimal form under the most unfavorable conditions determined by an expression $(n/2) \tau_1$, where $\tau_1$ is the time required for an elementary convolution involving a group of p+2 bit positions. Thus, the maximum addition time will be $T_{max} = (n^2/4) \tau_1$.

The described addition process requires that parallel half-adders be available for each pair of identical bit position of the augend and addend, each half-adder comprising an adder modulo 2 and an AND gate.

The numbers belonging to Fibonacci number systems make it possible to create such an algorithm of addition for p-numbers in which the augend and addend are first represented in a partially devolved form, which means that a 1 in the ith bit position of the original augend (addend) is replaced by 1's in the i−1th and (i−p−1)th bit positions according to the known relation describing Fibonacci p-numbers:

$$\phi_p(k) = \phi_p(k-1) + \phi_p(k-p-1) \quad (1)$$

where $\phi_p(k)$ is the weight of the kth bit position.

After the values of the augend and addend in the partially devolved form are placed into the corresponding registers, the augend is reduced to the minimal form and 1's from the codeword of the addend are transferred into the augend register provided the value of the identical bit position of the augend is 0. Thus, conventional addition is replaced in the case of Fibonacci number systems by an operation in which the augend and addend are reduced concurrently to the minimal form.

SUMMARY OF THE INVENTION

An object of the invention is to provide a Fibonacci p-code parallel adder having a logic unit capable of transfering 1's from a certain bit position of the addend register into the identical "zero" bit position of the augend register.

Another object of the invention is to provide a Fibonacci p-code parallel adder having a register capable of storing and processing data on the codewords of the augend and addend so as to allow for further reduction of the sum codeword to the minimal form.

There is disclosed a Fibonacci p-code parallel adder comprising an augend register and an addend register having outputs coupled to the data inputs of a logic unit, which is designed to perform addition and has its output coupled to respective data inputs of the augend and addend registers. An end-of-addition detector and a monitoring unit have inputs coupled to the outputs of the augend and addend registers; and a Fibonacci p-code minimizing unit is coupled to the augend register. According to the invention, a true output of the augend register and a true output of the addend register are coupled respectively to the inputs of the monitoring unit and the end-of-addition detector. A complement output of the addend register is coupled to a respective input of the Fibonacci p-code minimizing unit so as to allow that input to receive a convolution enable signal relating to an (i+p+1)th bit position of the unit. A second input and an output of the minimizing unit are coupled respectively to the true output and to a normalize signal input of the augend register. The logic unit comprises n rewrite AND gates which are used to transfer a 1 from an ith bit position of the addend register to an ith bit position of the augend register containing a 0. First and second inputs of an ith rewrite AND gate are coupled respectively to a complement output of the ith bit position of the augend register and to a true output of the ith bit position of the addend register so that the condition of the flip-flops of the ith bit positions of the augend and addend registers can be analyzed. An output of the ith rewrite AND gate is coupled to the set input of the ith bit position of the augend register so that a 1 can be placed in that bit position, and to the reset input of the ith bit position of the addend register, via a delay, whereby that position can change from the 1 state to the 0 state. The remaining inputs of the rewrite AND gates are joined together and coupled to a third input of the Fibonacci p-code minimizing unit and to a control bus of the adder, which is used to deliver a long control signal, where n is the Fibonacci p-code length and $i=0,1,2,\ldots,n-1$.

The Fibonacci p-code parallel adder of the invention offers an increased speed of operations. Even under the most unfavorable conditions where two summands A and B, represented as $A=0\ 1\ 1\ 1\ 1\ 1\ldots$ and $B=0\ 1\ 1\ 1\ 1\ 1\ 1\ldots$, are added, the maximum addition time $T_{max}$ is equal to $(2n-2)\tau_1$, where n is the length of the summands in the minimal form of a Fibonacci p-code and $\tau_1$ is the rewrite time which is considered to be equal to the time taken by an elementary convolution.

The logic unit is realized as n AND gates. This provides for lesser cost of the equipment and greater operational relaibility of the adder.

BRIEF DESCRIPTION OF THE DRAWINGS

The invention will now be described by way of example with reference to the accompanying drawings in which.

DESCRIPTION OF THE INVENTION

Figure 1:
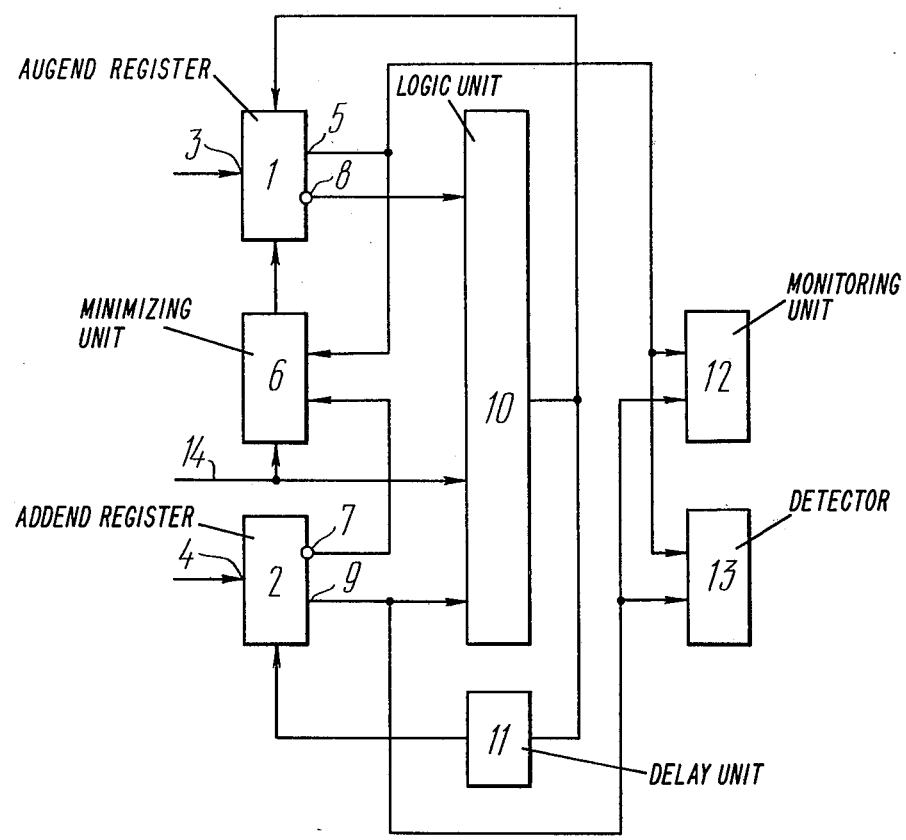
FIG. 1 is a block diagram of a Fibonacci p-code parallel adder, according to the invention.

The Fibonacci p-code parallel adder (FIG. 1) comprises an augend register 1 and an addend register 2 which store relatively the original augend and addend represented in a Fibonacci p-code and applied to original code write inputs 3 and 4. A true output 5 of the augend register 1 is coupled to an input of a Fibonacci p-code minimizing unit 6 which has its multidigit output coupled to a multidigit normalization control input of the augend register 1, thereby providing for the reduction of the Fibonacci p-code contained in the register 1 to the minimal form. Another input of the unit 6 is coupled to a complement output 7 of the addend register 2. The Fibonacci p-code minimizing unit 6 is designed to reduce to the minimal form the codewords contained in the augend register 1, which action depends on the condition of the corresponding bit positions of the addend register 2. A complement output 8 of the augend register 1 and the true output 9 of the addend register 2 are coupled to the data inputs of the logic unit 10 which is operated to transfer a 1 from an ith bit position of the addend register 2 to an ith bit position of the augend register 1, which contains a 0. The output of the logic unit 10 is coupled directly to the data input of the augend register 1 and to the data input of the addend register 2 via a delay unit 11. The delay unit therefore introduces a delay between the rewrite signals received by the addend register 2 and the augend register 1, with the result that the adder operates without ambiguity. A monitoring unit 12 operates to check whether the addition is performed properly, while an end-of-addition detector 13 produces a signal acknowledging that a transient in the adder is terminated and the values of the bit positions in the addend register 2 are brought to 0 and the augend register 1 contains a sum codeword in the minimal form. The inputs of the monitoring unit 12 and the end-of-addition detector 13, which are implemented according to the USSR Inventor's Certificate No. 559,237, are coupled respectively to the true outputs 5 and 9 of the registers 1 and 2.

A control bus 14 of the adder, which delivers a long control signal, is coupled to a third input of the unit 6 and to a control input of the logic unit 10. The length of the control signal is selected to be sufficient for the cycles of the rewrite operation to be performed in the logic unit 10 and for the elementary convolutions to be performed in the Fibonacci p-code minimizing unit 6. The inputs and outputs of the units 6, 10, 11, 12 and 13 and registers 1 and 2 are multidigit ones each having n bit positions, where n is the length of the register 1 or 2.

Figure 2:
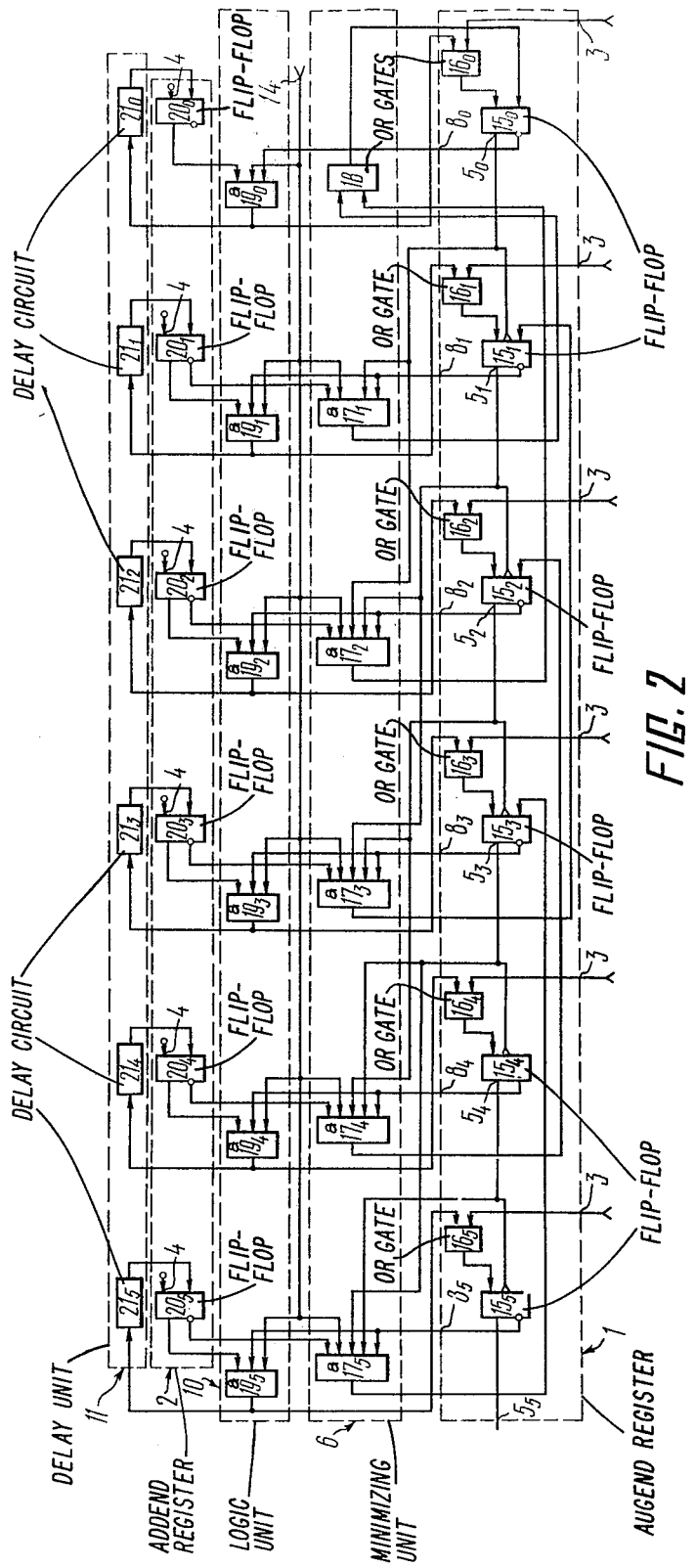
FIG. 2 is a block diagram of a logic unit, registers and a Fibonacci p-code minimizing unit of the adder, according to the invention.

FIG. 2 illustrates a block diagram of a portion of the adder of the invention in the case when $n=6$ and $p=1$, where p is the Fibonacci number. The monitoring unit 12 and detector 13 of conventional design are not shown in the figure.

The augend register 1 comprises five complement flip-flops $15_1$–$15_5$ in accordance with code bit positions from one to five and an RS flip-flop $15_0$ which is used to place the value of the low-order digit of the code into the register 1. A set output $5_i$ of a flip-flop $15_i$ of an ith bit position of the augend register 1, where $i=0, 1, 2, \ldots, n-1$, is an ith output of a true multidigit output 5 of the register 1 and is coupled to the inputs of the monitoring unit 12 and the end-of-addition detector 13 (FIG. 1). A plurality of reset outputs $8_0$–$8_5$ (FIG. 2) of the flip-flops $15_0$–$15_5$ constitute the complement output 8 of the augend register 1. The augend register 1 also comprises six rewrite OR gates $16_0$–$16_5$. The output of a rewrite OR gate $16_i$ is coupled to the set input of a flip-flop $15_i$, and a plurality of the inputs of the rewrite OR gates $16_0$–$16_5$ constitute the original code write input 3 of the register 1.

The Fibonacci p-code minimizing unit 6 comprises five convolution AND gates $17_1$–$17_5$ and a convolution OR gate 18 which is inserted in the low-order bit position and has its inputs coupled to the outputs of AND gates $17_1$ and $17_2$, and its output coupled to the reset input of the flip-flop $15_0$ of the low-order bit position of the register 1.

The logic unit 10 comprises six rewrite AND gates $19_0$–$19_5$, and the addend register 2 comprises six RS flip-flops $20_0$–$20_5$ which have their reset inputs coupled to the outputs of the corresponding delays $21_0$–$21_5$ of the delay unit 11.

In the logic unit 10, a first input of the rewrite AND gate $19_i$ is coupled to the complement output $8_i$ of the flip-flop $15_i$ of the register 1, which is also coupled to an input of the convolution AND gate $17_i$ of the Fibonacci p-code minimizing unit 6. A second input of the convolution AND gate $17_i$ is coupled to a true output $5_{i-1}$ of the flip-flop $15_{i-1}$ of the register 1, which is also coupled to a third input of the convolution AND gate $17_{i+1}$. The third input of the convolution AND gate $17_i$ is coupled to the complement output of the flip-flop $20_i$ of the addend register 2, whose true output is coupled to an input of the rewrite AND gate $19_i$. The control bus 14 of the adder is coupled to the remaining inputs of the convolution AND gates $17_1$–$17_5$ and the rewrite AND gates $19_1$–$19_5$. The output of the convolution AND gate $17_i$, with i equal to 3 and more, is coupled to the reset input of the flip-flop $15_{i-2}$ of the register 1; the output of the rewrite AND gate $19_i$ is coupled to the remaining input of the rewrite OR gate $16_i$ and to the input of the delay $21_i$. The insertion of the rewrite OR gate $16_i$ into the ith bit position of the augend register 1 makes it possible to extend the input of the flip-flop $15_i$; this means that original data as well as data from the addend register 2 can be placed into the flip-flop $15_i$ of the augend register 1. A delay provided by the delay $21_i$ exceeds a delay from the rewrite OR gate $16_i$. As a result, the flip-flop $15_i$ takes up a new state somewhat earlier, as compared to the flip-flop $20_i$.

The Fibonacci p-code parallel adder operates in the following manner. The initial states of the flip-flops $15_0$–$15_5$ of the augend register 1 and the flip-flops $20_0$–$20_5$ of the addend register 2 are in the 0 state and the control bus 14 of the adder receives zero potential.

Assume that two numbers A=7 and B=5 are to be added which are represented in a Fibonacci 1-code as follows:

| Weight of bit position | 8 | 5 | 3 | 2 | 1 | 1 |
|---|---|---|---|---|---|---|
| No. of bit position | 5 | 4 | 3 | 2 | 1 | 0 |
| Fibonacci 1-code of number A | 0 | 1 | 0 | 1 | 0 | 0 |
| Fibonacci 1-code of number B | 0 | 1 | 0 | 0 | 0 | 0 |

According to the algorithm of the adder, the numbers A and B in the partially devolved form are applied to the original code write inputs 3 and 4 of the registers 1 and 2.

This conversion (devolution of the original minimal codes of the summands) is accomplished using the respective components of the adder circuitry. To this end, the adder inputs corresponding to the bit positions i−1 and i−p−1 receive the original data on the condition of the ith bit position.

For example, with p=1, the input bus corresponding to the bit position of the code with the weight 8 is coupled to the inputs of the bit positions with the weights 5 and 3, with the result that a certain Fibonacci code represented as 1 0 0 1 0 0 1 0 0 . . . assumes the form 0 1 1 0 1 1 0 1 1 . . . after the summands are placed in the registers 1 and 2.

In the above-mentioned example, the augend (number A) is applied to the input 3 of the augend register 1 as A=0 0 1 1 1 1, whereas the addend (number B) appears at the input 4 of the addend register 2 as B=0 0 1 1 0 0. The codeword of the augend is applied, via the rewrite OR gates $16_0$–$16_5$, to the set inputs of the flip-flops $15_0$–$15_5$ of the augend register 1, with the result that the flip-flops $15_0$, $15_1$, $15_2$, and $15_3$ of the respective bit positions zero, one, two and three assume the 1 state. The codeword of the addend is applied to the set inputs of the flip-flops $20_0$–$20_5$ of the addend register 2, with the result that the flip-flops $20_2$, $20_3$ of the bit positions two and three assume the 1 state. Thus, the adder is ready to perform addition which commences when a logic 1 is applied to the control bus 14. This results in the appearance of a logic 1 at the output of the convolution AND gate $17_4$ of the Fibonacci p-code minimizing unit 6, since logic 1's are present at the inputs of said gate. This means that the convolution condition is satisfied when the flip-flop $20_4$ of the addend register 2 assumes the 0 state, the flip-flop $15_4$ of the augend register 1 assumes the 0 state and the flip-flops $15_3$ and $15_2$ assume the 1 state. A logic 1 from the output of the flip-flop $17_4$ is applied to the reset input of the flip-flop $15_2$ which thus takes up the 0 state. As a result, the complement output $8_2$ of the flip-flop $15_2$ produces a logic 1, while the true output $5_2$ produces a logic 0 which is applied to the counting input of the flip-flop $15_3$ which thus assumes the 0 state. At the same time, the complement output of the flip-flop $15_2$ produces a logic 1 which is applied to a respective input of the AND gate $19_2$ so that the latter is activated and its output produces a logic 1. This means that the rewrite condition is satisfied in which the flip-flop $20_2$ of the addend register 2 assumes the 1 state and the flip-flop $15_2$ of the augend register 1 assumes the 0 state. This logic 1 is applied, via the second input of the rewrite OR gate $16_2$ to the set input of the flip-flop $15_2$ of the augend register 1 and that flip-flop again assumes the 1 state. A logic 1 from the output of the rewrite AND gate $19_2$ is applied to the input of the delay $21_2$ and, after time $\tau_{21}$ has elapsed, appears at the reset input of the flip-flop $20_2$ of the addend register 2 so that the latter assumes the 0 state. As a result, a 1 is transferred from the second bit position of the addend register 2 to the second bit position of the augend register 1. The delays $21_0$–$21_5$ are constructed so that the following inequality is satisfied $$\tau_{20} + \tau_{21} > \tau_{16} + \tau_{15} \qquad (2)$$

where
$\tau_{20}$ is the delay time introduced by the flip-flops $20_0$–$20_5$;
$\tau_{21}$ is the delay time introduced by the delays $21_0$–$21_5$;
$\tau_{16}$ is the delay time introduced by the rewrite OR gates $16_0$–$16_5$; and
$\tau_{15}$ is the delay time introduced by the flip-flops $15_0$–$15_5$.

If the condition determined by (2) is not satisfied, a chasing effect might occur.

Indeed, if the flip-flop $20_2$ of the addend register 2 assumes the 0 state at the moment preceding that when the flip-flop $15_2$ assumes the 1 state, the convolution condition for the second bit position is satisfied and the output of the convolution AND gate $17_2$ produces a logic 1 which is invalid.

As stated above, the flip-flop $15_3$ assumes the 0 state and its true output $5_3$ produces a logic 0, with the result that the flip-flop $15_4$ changes from the 0 to the 1 state. At the same time, the complement output $8_3$ of the flip-flop $15_3$ produces a logic 1 which is applied to the input of the rewrite AND gate $19_3$. Now, the rewrite condition for the third bit position is satisfied and the output of of the rewrite AND gate $19_3$ produces a logic 1 which is applied, via the rewrite OR gate $16_3$, to the set input of the flip-flop $15_3$ which thus assumes the 1 state. After time $\tau_{21}$ has elapsed, the same signal causes the flip-flop $20_3$ of the addend register 2 to assume the 0 state. As a result, a 1 is transferred from the third bit position of the addend register 2 into the third bit position of the augend register 1.

Now, the flip-flops $20_0$–$20_5$ of the addend register 2 are brought to the 0 state.

The augend register 1 contains the sum codeword having a form that differs from the minimal form (A+B=0 1 1 1 1 1). Therefore, it is necessary to reduce the sum codeword to the minimal form. This is done by means of the Fibonacci p-code minimizing unit 6 which utilizes the known technique analogous to that of a conventional adder as follows:

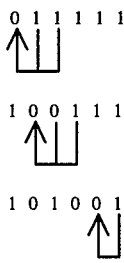

```
0 1 1 1 1 1

1 0 0 1 1 1

1 0 1 0 0 1
```

The sign  denotes a convolution operation involving (i−1)th, (i−2)th and ith bit positions.

A table given below illustrates the above-described addition process. The condition of the flip-flops $15_0$–$15_5$ and $20_0$–$20_5$ of the registers 1 and 2 is described in relation to the time intervals which are selected to be equal to delays $\tau_{15}$ and $\tau_{20}$ provided by one of the above-mentioned flip-flops.

| Addition step | Summand codeword |
|---|---|
| Original summands | B = 0 1 0 0 0 0 |
| | A = 0 1 0 1 0 0 |
| Placing into registers 1 and 2 (partial devolution of the codewords) | B = 0 0 1 1 0 0 |
| | A = 0 0 1 1 1 1 |
| Transfer of a 1 from register 2 to register 1 | B = 0 0 1 1 0 0 |
| | A = 0 0 1 0 1 1 |
| Transfer of a 1 from register 2 to register 1 | B' = 0 0 1 0 0 0 |
| | A' = 0 0 0 1 1 1 |
| Condition of registers 1 and 2 after the number A is subject to convolution and 1's are transferred from the codeword of the number B to the codeword of the number A | B'' = 0 0 0 0 0 0 |
| | A'' = 0 1 1 1 1 1 |
| | A'' = A + B |
| First step of convolution of the sum A'' | B'' = 0 0 0 0 0 0 |
| | A'' = 0 1 0 1 1 1 |
| The following steps of convolution of the number A in the above-mentioned time intervals $\tau_{15}$ | A'' = 0 0 0 1 0 1 |
| | A'' = 1 0 0 0 0 0 |
| | A'' = 1 0 1 0 1 0 |
| Addition is complete A + B = A'' | |

The table shows that the convolution of the bit positions and the transfer of 1's from the addend codeword to the augend codeword are performed in steps of a given succession.

The end-of-addition detector 13 produces a signal that acknowledges the end of the addition process. When a logic 1 appears at its output, this means that the flip-flops $20_0$–$20_5$ of the addend register 2 contain 0's and the augend register 1 contains the minimal form of the sum codeword.

The monitoring unit 12 is used to check the addition process. Its output produces a logic 1 when the ith bit positions of the registers 1 and 2 contain 1's and the (i−1)th and (i+1)th bit positions of the registers 1 and 2 contain 0's. When such a situation occurs (0 1 0 in the register 1 and 0 1 0 in the register 2), a mistake is acknowledged.

The addition operation is made more rapid and the quantity of the required equipment is reduced, as new couplings are introduced and both summands are represented in the form differing from the standard one. In the adder of the invention, the addition is performed in an asynchronous way and consists in a number of operations dealing with the reduction of a Fibonacci p-code of one of the summands to the minimal form, the other being taken into consideration during the reduction. The time necessary for an elementary convolution, including conversion of the code . . . 0 1 1 . . . to the code . . . 1 0 0 . . . , is $\tau_1$. In the case of the adder of the invention, the addition is performed under the most unfavorable conditions as to the speed of preparation when both summands are represented as A=1 0 1 0 1 0 . . . and B=1 0 1 0 1 0 . . . . If the length of a codeword is equal to n, then the maximal addition time $T_{max}$ is equal to (2n−2) $\tau_1$. On the other hand, the prototype deals with synchronous addition. The maximum number of addition cycles will be n/2. The length of an addition cycle is determined by the time within which the intermediate sum is subject to maximal convolution, said time being equal to (n/2)$\tau_1$. Then, the maximal addition time $T_{max}$ will be equal to (n²/4)$\tau_1$. With n=20, the operation speed of the adder of the invention is 2.6 times that of the known adders. The adder of the invention comprises a lesser quantity of components, as only one AND gate is necessary for each bit position.

Since the adder of the invention comprises the logic unit 10 built of AND gates and the augend register 1 built of OR gates, and the addition is a process during which both summands are subject to concurrent normalization, the operation speed is increased and the quantity of the required components of the adder is reduced.

What is claimed is:

1. A Fibonacci p-code parallel adder comprising:
an n-digit augend register and an n-digit addend register each having an original code write input to receive respectively an augend and an addend represented in Fibonacci p-codes, an ith bit position of said n bit positions of each of said registers comprising at least a flip-flop having a reset input, a complement output, a set input and a true output, said set inputs of said bit positions of said registers being used as said original code write inputs;
a logic unit comprising n rewrite AND gates, an ith gate of said rewrite AND gates having three inputs and an output, first and second inputs of said ith rewrite AND gate being coupled respectively to said complement output of said ith bit position of said augend register and to said true output of said ith bit position of said addend register to provide for analyzing the condition of said flip-flops of said ith bit positions of said augend and addend registers;
a delay unit comprising n delays, said output of said ith rewrite AND gate being coupled to said set input of said ith bit position of said augend register and to said reset input of said ith bit position of said addend register via a respective delay to transfer a 1 from said ith bit bit position of said addend register to said ith bit position, containing a 0, of said augend register;

a Fibonacci p-code minimizing unit having two data inputs, a control input, and a normalize signal output, first and second data inputs of said Fibonacci p-code minimizing unit coupled respectively to said true outputs of said bit positions of said augend register and to said complement outputs of said bit positions of said addend register to provide for analyzing the codewords contained in said registers, said output of said Fibonacci p-code minimizing unit being coupled to a normalize signal input of said augend register to provide for the reduction, to the minimal form, of the codeword stored in said augend register and representing a sum code of the augend and addend;

an end-of-addition detector having inputs coupled to said set outputs of said bit positions of said augend and addend registers, and having an output which produces an end-of-addition signal when the addend register contains a zero code and the augend register contains a sum code represented in the minimal form of a Fibonacci p-code; and a monitoring unit having inputs coupled to said true outputs of said bit positions of said augend and addend registers, and having an output which produces an error indicating signal when the form of the codeword contained in said augend register differs from the minimal form; wherein control inputs of said Fibonacci p-code minimizing unit and said logic unit are coupled to a control bus of the adder, and n is the length of the Fibonacci p-code and $i = 0, 1, 2 \ldots, n-1$.

* * * * *